(12) United States Patent
Wolford et al.

(10) Patent No.: US 11,633,863 B2
(45) Date of Patent: Apr. 25, 2023

(54) CONDITION-BASED ROBOT AUDIO TECHNIQUES

(71) Applicant: Digital Dream Labs, LLC, Pittsburgh, PA (US)

(72) Inventors: Jason Wolford, Berkeley, CA (US); Ben Gabaldon, Oakland, CA (US); Jordan Rivas, San Francisco, CA (US); Brian Min, Concord, CA (US)

( * ) Notice: Subject to any disclaimer, the term of this patent is extended or adjusted under 35 U.S.C. 154(b) by 39 days.

(21) Appl. No.: 15/947,714

(22) Filed: Apr. 6, 2018

(65) Prior Publication Data

US 2019/0308327 A1 Oct. 10, 2019

(51) Int. Cl.
*B25J 11/00* (2006.01)
*B25J 9/16* (2006.01)
*B25J 13/00* (2006.01)
*G10L 15/26* (2006.01)

(52) U.S. Cl.
CPC ............. *B25J 11/001* (2013.01); *B25J 9/162* (2013.01); *B25J 13/003* (2013.01); *G10L 15/26* (2013.01)

(58) Field of Classification Search
CPC ....... G06N 3/008; G06N 3/004; B25J 11/001; G05B 2219/39254
See application file for complete search history.

(56) References Cited

U.S. PATENT DOCUMENTS

| | | | |
|---|---|---|---|
| 4,398,720 A * | 8/1983 | Jones | A63F 3/00643 273/238 |
| 6,175,772 B1 * | 1/2001 | Kamiya | G06N 3/008 700/31 |
| 6,438,454 B1 * | 8/2002 | Kuroki | B25J 13/003 700/108 |
| 6,505,098 B1 * | 1/2003 | Sakamoto | A63H 3/52 700/215 |
| 7,065,490 B1 * | 6/2006 | Asano | G10L 13/033 318/568.12 |
| 8,196,551 B1 * | 6/2012 | Tsengas | A01K 15/025 119/707 |
| 11,352,135 B2 * | 6/2022 | McLean | G06T 19/006 |
| 2002/0081937 A1 * | 6/2002 | Yamada | A63H 3/48 446/175 |
| 2002/0087498 A1 * | 7/2002 | Yoshida | G06N 3/008 706/45 |

(Continued)

OTHER PUBLICATIONS

U.S. Appl. No. 15/694,710, filed Jan. 9, 2017, Tappeiner et al.

(Continued)

*Primary Examiner* — Ryan Rink
(74) *Attorney, Agent, or Firm* — David G. Oberdick; Chiara F. Orsini

(57) ABSTRACT

Methods, systems, and apparatus, including computer programs encoded on computer storage media, for audio augmentation of physical robot sounds. A robot can determine that a first physically moveable component of the robot is to be actuated and in response, obtain a conditional state of the robot. The robot can obtain an audio object that generates an audio enhancement for the first physically moveable component being actuated, the audio enhancement having one or more characteristics that match the obtained conditional state of the robot. The robot can output the audio enhancement while actuating the first physically moveable component.

22 Claims, 6 Drawing Sheets

Happy Servo Head Raise Augmented Sound
110

Angry Servo Head Raise Augmented Sound
120

(56) References Cited

U.S. PATENT DOCUMENTS

| | | | |
|---|---|---|---|
| 2002/0138359 A1* | 9/2002 | Noma | G06Q 30/06 705/26.5 |
| 2003/0045203 A1* | 3/2003 | Sabe | G06N 3/008 446/356 |
| 2003/0055653 A1 | 3/2003 | Ishii et al. | |
| 2003/0083784 A1* | 5/2003 | Nagai | H04Q 9/00 700/245 |
| 2004/0093118 A1* | 5/2004 | Sabe | A63H 3/28 700/245 |
| 2012/0022688 A1* | 1/2012 | Wong | G06N 3/008 700/253 |
| 2015/0336276 A1* | 11/2015 | Song | B25J 11/001 700/253 |
| 2017/0266812 A1* | 9/2017 | Thapliya | B25J 11/0005 |
| 2017/0365277 A1* | 12/2017 | Park | G10L 15/22 |
| 2018/0178372 A1* | 6/2018 | Lee | G06V 20/10 |
| 2020/0039080 A1* | 2/2020 | Oyaizu | B25J 13/00 |

OTHER PUBLICATIONS

U.S. Appl. No. 15/725,209, filed Apr. 10, 2017, Neuman et al.
European Patent Office Search Report for Appl. No. 19780742.3 dated Mar. 9, 2022.

\* cited by examiner

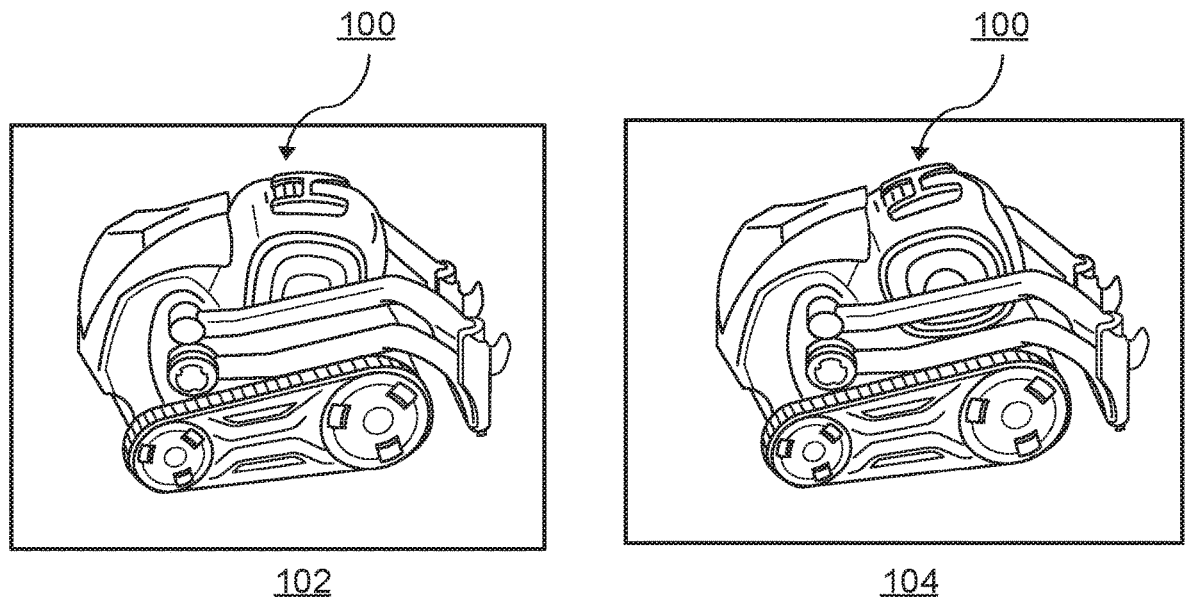
Happy Servo Head Raise Augmented Sound
110
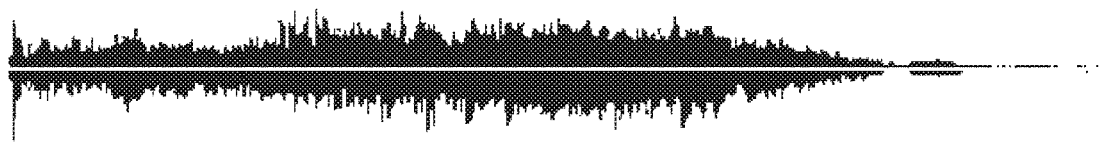
Angry Servo Head Raise Augmented Sound
120
FIG. 1

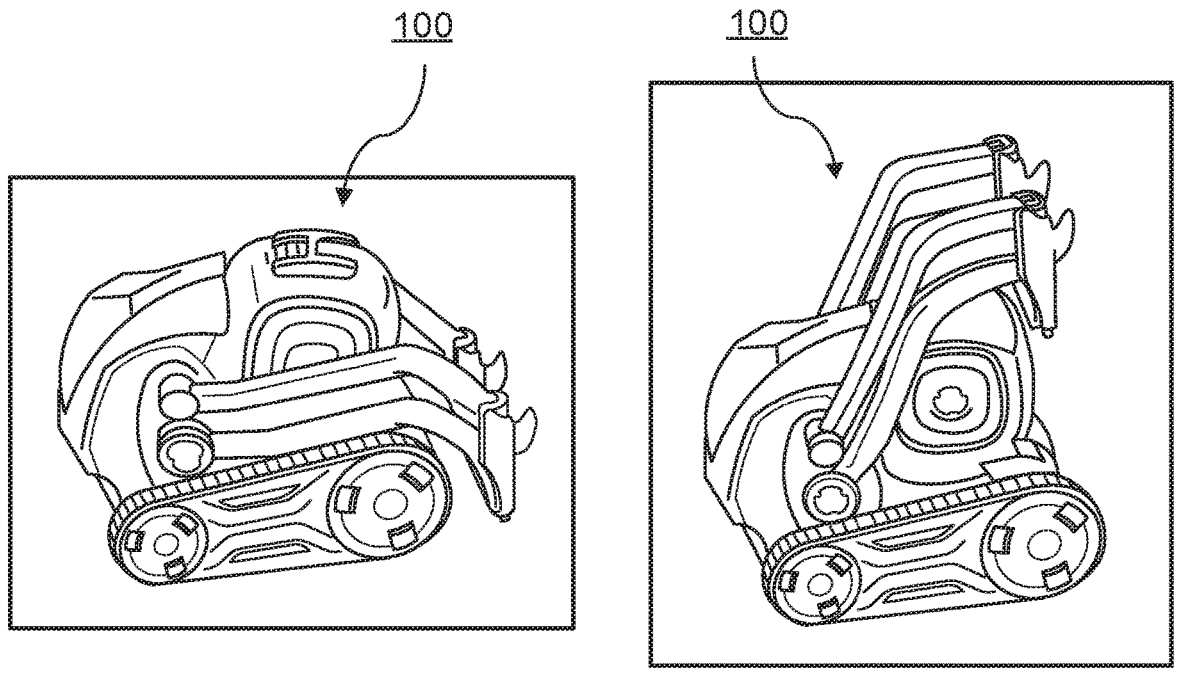
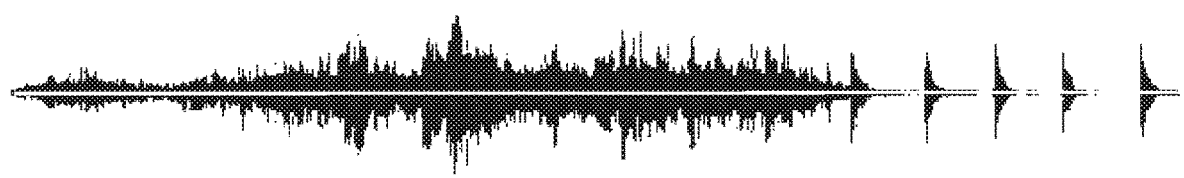
Happy Servo Lift Raise Augmented Sound
210
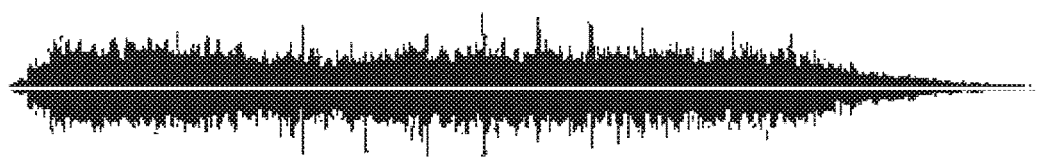
Angry Servo Lift Raise Augmented Sound
220
FIG. 2

CONDITION-BASED ROBOT AUDIO TECHNIQUES

BACKGROUND

This specification relates generally to robots, and more particularly to audio generated by consumer robots.

A robot is a physical machine configured to perform physical actions autonomously or semi-autonomously. Robots have one or more integrated control subsystems that effectuate the physical movement of one or more robotic components in response to particular inputs. Robots can also have one or more integrated sensors that allow the robot to detect particular characteristics of the robot's environment. Modern day robots are typically electronically controlled by dedicated electronic circuitry, programmable special-purpose or general-purpose processors, or some combination of these.

User interaction with mobile robots is more challenging than with some other electronic devices for a number of reasons. First, mobile robots may have a very limited capacity for electronically communicating information, e.g., a mobile robot may have only a very small electronic display or no display at all. Therefore, users may have more difficulty obtaining information about the internal state of a mobile robot than they would acquiring such information from a device with a large dedicated screen, e.g., a mobile phone or a desktop computer. In addition, unlike a mobile phone or a desktop computer, mobile robots often operate at some distance away from the user, e.g., throughout the home, and the distance can constantly change. Therefore, users can be frustrated that robots seem unresponsive, impersonal, or both. Therefore, one challenge faced by designers of consumer robots is enhancing the user-robot interactions and interface in the face of these challenges.

Audio augmentation is a technique by which the sound generated by a mechanical device is boosted or enhanced by electronically generated audio. This technique is often implemented by automotive manufacturers so that smaller automobiles do not sound underpowered to the driver. For example, electric or hybrid vehicle engines create less sound than gasoline-powered engines. Thus, the sound of an electric car engine can be augmented with an electronically generated sound of a gasoline engine, which can make the engine sound more powerful to the driver.

SUMMARY

This specification describes techniques for audio enhancement of physically moveable components of a mobile robot in order to convey an internal conditional state of the robot. The output audio augments the physical sounds created by the actuation of one or more physically movable components of the robot in a way that naturally communicates the internal conditional state of the robot to the user. This allows the robot to provide subtle, but intuitive, real-time, and highly responsive feedback to the user. This is turn makes robots easier to use, increases user engagement, and makes robots seem more anthropomorphic, and thereby more fun.

Particular embodiments of the subject matter described in this specification can be implemented so as to realize one or more of the following advantages. Outputting condition-specific audio enhancements improves the user-robot interactions by effectively increasing the communication bandwidth by conveying the robot's internal state to the user beyond the typical visual or animatronic-only means. When users have such a real-time view into the internal state of the robot, the robot is easier to understand, easier to use, and seems more lifelike. The audio enhancements can also convey additional character aspects of the robot that are not possible otherwise. For example, the robot can convey cartoonish sound effects to exaggerate an action or even generate audio enhancements that convey an environmental situation that is entirely fictional. In another variant, audio might make the robot sound more assured of its movements and therefore more likely to evoke trust from the user.

Outputting condition-specific audio enhancements can also diminish the prominence of undesirable physical sounds that, due to design and cost constraints, can be hard to control. For example, users generally expect that robots emit physical sounds through the actuation of their physical components, but such sounds may not match the perception the robot's designer desires the robot to convey, e.g., normal mechatronic sounds, may be "wimpy" or sound low-volume compared with the power or other impression the designer of the robot intended for the robot. Using audio enhancements can ameliorate the mismatch between the internal state of the robot and the sounds that are inevitably produced by its mechanical components.

The audio enhancements can also help a user engage more naturally with a robot that is not in the user's line of sight, e.g., if the human and robot are in different rooms, by informing the user of the robot's conditional state without the need for visual cues. By immersing the user in a continuous output of condition-specific audio enhancements, even when the robot is out of sight of the user, the robot will seem more intelligent and real.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE FIGURES

FIG. 1 illustrates stages of a head-raising action and waveforms of different audio enhancements corresponding to different emotion states FIG. 2 illustrates stages of an arm-raising action and waveforms of audio output by a robot of FIG. 1 performing the arm-raising action while in two different emotion states.

Like reference numbers and designations in the various drawings indicate like elements.

DETAILED DESCRIPTION

Figure 3:
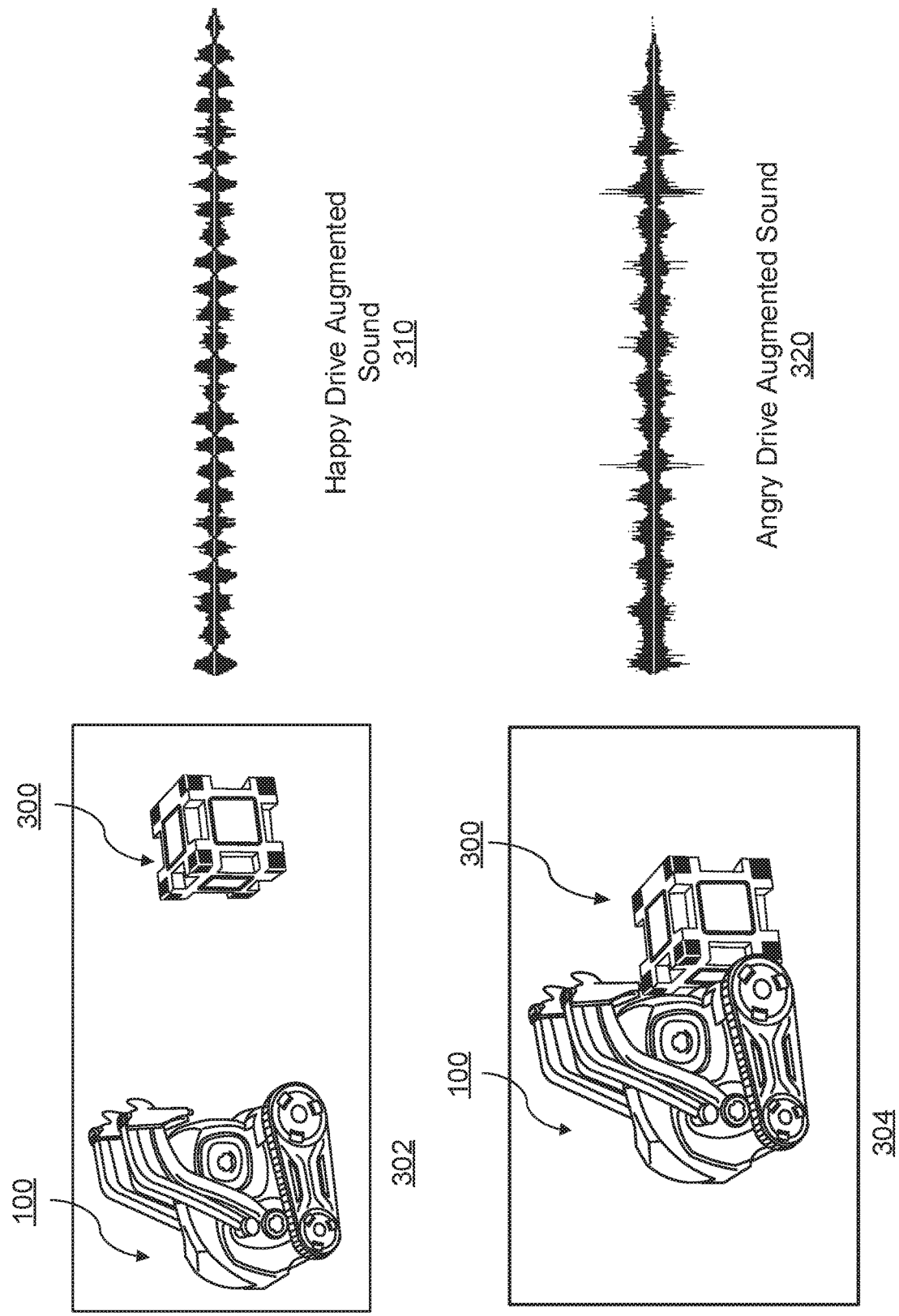
FIG. 3 illustrates stages of a driving action and waveforms of audio output by the robot of FIG. 1 performing the driving action while in two different emotion states.

This specification describes techniques for audio enhancement of physical robot sounds based on a conditional state of the robot. This means that the same physical sound can be augmented with different audio enhancements depending on the conditional state of the robot. For example, a robot can be configured to output a different audio enhancement for the sound of a physically moveable component while in a first conditional state, e.g., the robot has a happy emotion state, and a different audio enhancement for the sound of the same physically moveable component while in a different second conditional state, e.g., the robot has a sad emotion state. The user will thus hear a sound that is a blend of (1) a sound produced by the robot actuating the physically moveable component and (2) an audio enhancement output by the robot that simulates actuating the physically movable component in a way that communications the internal conditional state to the user.

The conditional state of a robot can include an emotion state. The emotion state of a robot is an internal state that the robot can maintain to select its actions or behaviors. The emotion state can be represented using a single-dimensional or a multi-dimensional data structure, e.g., a vector or an array. For example, a single-dimensional vector can be used where each column represents an aspect of the emotion state, and each component of the vector is a value that represents to what degree or whether that aspect is included in the current emotion state of the robot. For example, an example emotion state can be a vector of size three, with each column representing a binary value indicating whether the emotion state of the robot includes the following aspects: Happy, Excited, Social. The example emotion state can be represented by the vector: <1, 1, 0>, indicating that the robot is happy and excited, but not social. As another example, the components of the vector can be non-binary values that represent a degree to which the emotion state of the robot includes a certain aspect. If the degrees range from 1 to 3, with 1 being the lowest value and 3 being the highest value, then another example emotion state can be represented by the vector <3, 2, 1>, indicating that the robot has a high degree of happiness, a medium high degree of excitement, and a low degree of socialness. As another example, the emotion state can simply be a value that indicates one of an enumerated number of possible values, e.g., happy, excited, or social, to name just a few examples.

The emotion states need not correspond to specifically identifiable human emotions. Rather, the emotion states can also represent other, more general or more specific spectrums that characterize the robot's behavior. For example, the emotion state can be a Social emotion state that represents how eager the robot is to interact with users generally, a Want-To-Play emotion state that represents how eager the robot is to engage in gameplay with a user, and a Winning emotion state that represents how competitive the robot is in games. Emotion states can also correspond to or represent current physical states of the robot, e.g., Needs-Repair, which causes the robot to perform actions more slowly.

The conditional state of a robot can also include one or more conditional parameters. Each conditional parameter represents a particular real or simulated condition affecting the robot. For example, a conditional parameter can represent a mode that the robot is currently operating in, and different modes will result in different audio augmentations being generated. For example, a robot can be in an "Alert Mode" or a "Service Mode" in which the robot is acting in furtherance of some non-play activity, e.g. performing a useful function like cleaning or security monitoring of a space. In these modes, the audio augmentations convey more seriousness and less playfulness, akin to a service animal not reacting as much to play or engagement stimulus when the animal is working. Another conditional parameter can convey an actual or simulated age of the robot. Humans understand and associate certain sounds with youth or old age (and older humans or animals do actually sound different than their younger counterparts, due to the decay of vocal cords and other musculature—a phenomenon known as presbyphonia), and a robot's conditional parameters can account for these age differences. For example, a robot having a conditional parameter representing youthfulness can evoke youthful glee ("Whippersnapper" sounding) by outputting a sound that simulates a smoothly-running electric motor, while a robot having a conditional parameter representing old age can output a sound that gives a user the impression that the robot has a worn combustion motor. As another example, a robot having a conditional parameter representing old age can output audio augmentations that make the robot seem assured and deliberate. The conditional parameter representing old age combined with slower than average movements, can make the robot sound and appear to the user as older and more reliable, or more frail and delicate to give the impression of being in ill health (similar to Needs-Repair). In a similar vein, a robot can have a conditional parameter representing being futuristic, or an opposite conditional parameter representing being old-fashioned. Therefore, the robot's audio enhancements can make the physical components sound more futuristic or more old-fashioned.

An example of a robot using condition-based audio enhancements can be viewed online by visiting goo.gl/7UbmPh or youtu.be/xTDuDvV7Y0k in a web browser. In this example, a robot can manipulate a cube in its environment by performing a number of actions whose physical effects are augmented differently according to an emotion state of the robot. First, a robot can cycle through actions having the following augmented sounds while in a Happy emotion state: Happy Driving Augmented Sound, Happy Servo Turn Augmented Sound, Happy Servo Head Raise Augmented Sound, Happy Servo Lift Raise Augmented Sound, Happy Driving Augmented Sound, Happy Servo Lift Pull Augmented Sound, and Happy Driving Augmented Sound. Conversely, a robot can then perform the same actions but play the following, different augmented sounds while in an Angry emotion state: Angry Driving Augmented Sound, Angry Servo Turn Augmented Sound, Angry Servo Head Raise Augmented Sound, Angry Servo Lift Raise Augmented Sound, Angry Driving Augmented Sound, Angry Servo Lift Pull Augmented Sound, and Angry Driving Augmented Sound. Thus, although the robot performs the same physical actions by actuating the same physical components, the user experience and impression that is communicated to the user is much different because of the differing emotion states. FIGS. 1-3 illustrate different aspects of this example in more detail.

FIG. 1 illustrates stages of a head-raising action and waveforms of different audio enhancements corresponding to different emotion states. In stage 102, the head of the robot 100 is in a lowered position. In stage 104, the head of the robot 100 is in a raised position.

While moving the head from stage 102 to stage 104, the physical components of the robot 100 create an inevitable physical sound. For example, the robot 100 can include a motor configured to actuate the head of the robot. The motor creates a physical sound during the head-lifting action.

The robot 100 can generate an audio enhancement based on the head-lifting action and the current emotion state of the robot, which the robot can output over integrated or remote speakers in order to augment the physical sound created by the movement of the physically moveable head.

FIG. 1 illustrates a waveform 110 that represents an audio enhancement that can be output by the robot 100 over one or more speakers as a result of the robot 100 being in a happy emotion state while performing the head-lifting action. The waveform 110 represents the sound wave characteristics of the Happy Servo Head Raise Augmented Sound.

FIG. 1 also illustrates another waveform 120 that represents an audio enhancement that can be output by the robot 100 over one or more speakers as a result of the robot 100 being in an angry emotion state while performing the head-lifting action. The waveform 120 represents the sound wave characteristics of the Angry Servo Head Raise Augmented Sound.

Each of the waveforms 110 and 120 can simulate the sound of the motor being used to actuate the head of the robot 100. In this example, the robot 100 can output either waveform 110 or 120 concurrently with the motor being actuated, but the resulting experience of observing the head move may be markedly different.

The happy waveform 110, for example, can generate a bubbly, cartoonish sound of a motor moving. The angry waveform 120, on the other hand, can generate a darker, stormier sound of a motor moving.

Outputting the waveforms 110 or 120 concurrently with the generation of physical sounds by movement of one or more physical components of the robot 100 provides immediate and continuous feedback about the internal emotion state of the robot 100. In addition, outputting the waveforms 110 or 120 over the physical sound of actuating the one or more moveable components can diminish the influence of the inevitable physical sound on the user experience. Therefore, the user experiences a composite sound that alters the audio experience of observing the head lifting action. Furthermore, outputting the waveform 110 or 120 over the sound of the physical audio allows the robot to also communicate its emotion state in a way that is more subtle, more continuous, easier to observe, and easier to understand than other approaches, e.g., outputting speech (which may be misheard or not understood) or displaying text (which may not be seen due to the robot facing a different direction or being too far away). In addition, after some experience with the robot, users will intuitively learn the meaning of the audio enhancements and therefore will quickly be able to tell what the robot is doing and what emotion state the robot is in without even being able to see the robot.

FIG. 2 illustrates stages of an lift-raising action and waveforms of audio output by a robot 100 performing the lift-raising action while in two different emotion states. In stage 202, the lift of the robot 100 is in a lowered position. In stage 204, the lift of the robot 100 is in a raised position.

The physical components of the robot 100 will create a physical sound when the robot moves its lift from the position shown in stage 202 to that shown in stage 204. For example, the robot 100 can include a motor configured to actuate the lift of the robot. The motor will create a physical sound during the lift-raising action.

FIG. 2 also illustrates a waveform 210 that corresponds to an audio enhancement that can be output by the robot 100 over one or more speakers as a result of the robot 100 being in a happy emotion state while performing the arm-lifting action. The waveform 210 represents the sound wave characteristics of the Happy Servo Lift Raise Augmented Sound.

FIG. 2 also illustrates a waveform 220 that corresponds to an audio enhancement that can be output by the robot 100 when the robot is performing the arm-raising action while in the angry emotion state. The waveform 220 represents the sound wave characteristics of the Angry Servo Lift Raise Augmented Sound. Both waveforms 210 and 220 can also include portions of audio signals that simulate the physical sound that the one or more physically movable components of the robot 100 produce when performing the arm-raising action.

The generated audio enhancement can communicate that the internal emotion state of the robot 100 is a happy emotion state or angry emotion state while it is performing the arm-raising action.

For example, the waveform 210 played during the lifting action in the happy emotion state conveys levity and swiftness of the action, as if the robot has no care in the world. The waveform 210 also illustrates a sequence of clicks on the tail end of the waveform that evoke visions of a simple mechanical device operating.

On the other hand, the waveform 220 played during the lifting action in the angry emotion state corresponds to a less elegant sound that evokes the impression of more sluggish and labored action. This is so even when the time it takes to perform the lifting action is exactly the same for both emotion states.

In some implementations, the simulated sound can correspond to the load on the motor used to actuate the lift. For example, when the robot is lifting a heavy object, the simulated sound can be more strained compared to the simulated sound output when the robot is lifting a lighter object. The simulated sound can also indicate the state of other mechanical aspects of the robot such as a gearbox.

It is possible that the robot 100 uses similar physically movable components to actuate its head and arm, e.g., similar motors. Even if the same physically moveable component is used to actuate two different parts of the robot 100, the robot can generate different audio enhancements for the different actions. For example, the waveform 210 produced by the robot 100 when it is performing the arm-raising action can include a sound that simulates the sound of exerting effort, which performing the head-raising action may not include.

FIG. 3 illustrates stages of a driving action and waveforms of audio output by the robot 100 performing the driving action while in two different emotion states. In stage 302, the robot 100 begins a certain distance away from a cube 300. In stage 304, the robot 100 has driven to the cube 300.

The driving action can include using wheels and a tread to move towards the cube 300 with which the robot 100 can interact. The driving action generates a physical sound. For example, the rotation of the wheels can create a physical humming sound.

FIG. 3 illustrates a waveform 310 that represents an audio enhancement that can be output by the robot 100 over one or more speakers as a result of the robot being in a happy emotion state while performing the driving action. The waveform 310 represents the sound wave characteristics of the Happy Driving Augmented Sound. For example, the robot 100 can output an audio enhancement that simulates the sound generated by the movement of the wheels and with characteristics that match the happy emotion state. The waveform 310 corresponds to an audio enhancement that conveys a happy puttering engine sound, almost as if the robot is whistling while at work.

On the other hand, the waveform 320 corresponds to an audio enhancement that conveys more plodding and methodical action by an engine that sounds strained. The waveform 320 represents the sound wave characteristics of the Angry Driving Augmented Sound. This audio enhancement conveys the anger of the robot's internal emotion state, as if the robot is not happy about having to perform the driving action.

Note that the driving action in the happy emotion state and in the angry emotion state can take exactly the same path at exactly the same speed over exactly the same amount of time. Thus, the actual control signals for the driving action need not change depending on the emotion state. However, the impression of the driving action is much different when the robot is in the happy emotion state versus when the robot is in the angry emotion state due to the different audio enhancements for each state.

The audio enhancements also naturally bolster other feedback cues about the robot's emotion state. For example, the robot can include an electronic display that conveys facial expressions. When the robot is in the happy emotion state, the robot can display a smile and wide eyes while outputting the happy drive augmented sound 310. As another example, when the robot is in the angry emotion state, the robot can display a frown and eyes with heavy eyelids while outputting the angry drive augmented sound 320. The facial expressions paired with the audio enhancement further anthropomorphize the robot, and can allow the user to discover the meanings of the audio enhancements by observing the robot performing the same action while in two different emotion states.

Figure 4:
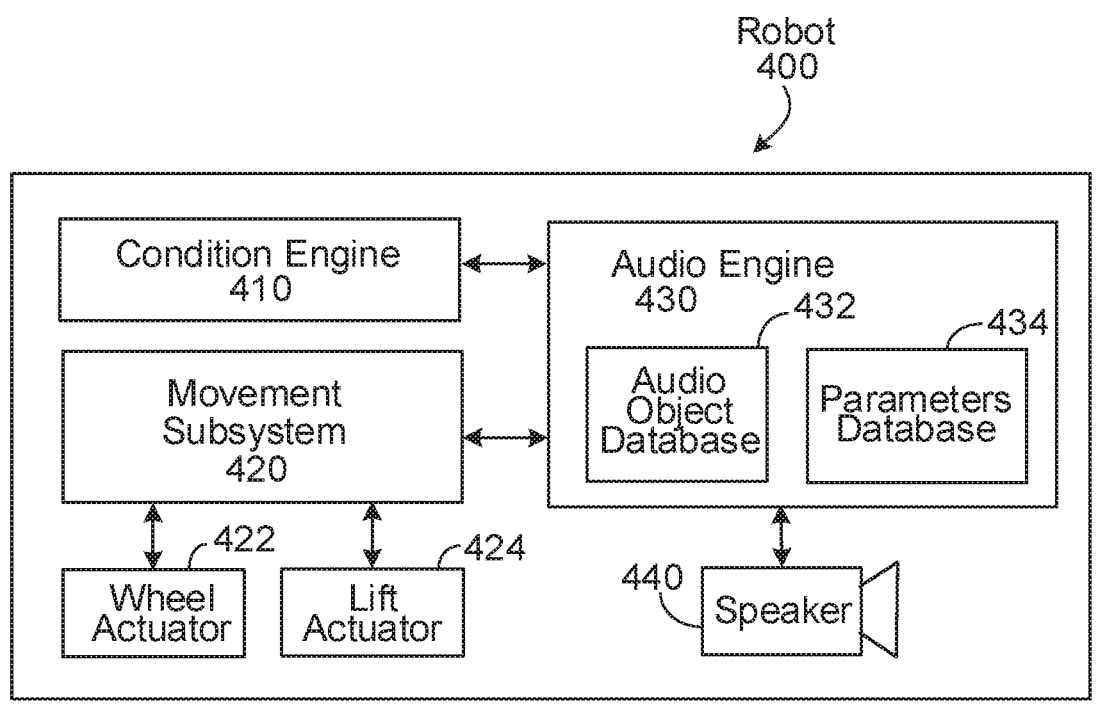
FIG. 4 illustrates components and subsystems of an example robot.

FIG. 4 illustrates components and subsystems of an example robot 400. The robot 400 includes a condition engine 410 and a movement subsystem 420, each communicatively coupled to an audio engine 430. The movement system 420 is also communicatively coupled to a wheel actuator 422 and a lift actuator 424. The audio engine 430 also includes an audio object database 432 and a parameters database 434. The audio engine 430 is also communicatively coupled to a speaker subsystem 440.

The condition engine 410 can manage the conditional state, including an emotion state, of the robot 400. For example, the robot 400 can determine an emotion state based on previous interactions with one or more users or one or more objects in an environment of the robot. For example, the robot 400 can recognize the presence of a cube. After recognizing the cube, the robot 400 can generate an excited emotion state. The robot 400 can then convey that it is in the excited emotion state by driving toward the cube, and while doing so, emitting an audio enhancement that simulates the sound of the wheels turning while being excited. Apart from recognizing the presence of an object, such as a cube, the robot can also detect a person (via facial recognition) and convey an emotion state while driving towards that person.

Each emotion state can include a plurality of levels for a given emotion state. For example, there can be two, 10, or 100, or more levels that divide the happy emotion state, with each level corresponding to a different degree of happiness. In this example, the robot can produce different audio enhancements depending on the emotion level of the robot. For example, if the happy emotion state is divided into three levels, the emotion engine 410 can assign the robot a level 3 happiness that corresponds to the robot 400 being most happy, while the emotion engine 410 can assign the robot levels 2 and 1 happiness that correspond to successively lesser happiness levels than level 3.

The condition engine 410 can be communicatively coupled to the audio engine 430. This coupling allows the condition engine 410 to communicate information about the conditional state of the robot to the audio engine 430.

The movement system 420 can control the movement of one or more physically moveable components of the robot 300. In this example, the movement subsystem 420 is communicatively coupled to two actuators: the wheel actuator 422 and the lift actuator 424. The movement subsystem 420 can send a control signal to the wheel actuator 422. In response to the control signal, the wheel actuator 422 can actuate one or more wheels of the robot 300. Similarly, the movement subsystem 420 can send a control signal to the lift actuator 424, and, in response to the control signal, the lift actuator 424 can actuate a lift of the robot 300. In some implementations, a robot can include more movable components than those described above. In those implementations, the movement subsystem of the robot can be communicatively coupled to an actuator for each moveable component of the robot.

The movement subsystem 420 is also communicatively coupled to the audio engine 430. This coupling allows the movement subsystem 420 to communicate information related to which of the physically moveable components of robot 300 are being actuated.

The audio engine 430 can receive information related to the conditional state of the robot 300 and information related to the movement of one or more of the physically moveable components of the robot 300. In response to receiving this information, the robot 300 can obtain a corresponding audio object.

An audio object can be stored in any appropriate format, e.g., as a file in a file system, a record in a database, or an object or structure in memory, to name just a few examples. In this example, the audio object can be obtained from an audio object database 432 that is configured to store a plurality of audio objects and to respond to queries by the audio engine 430 so that the audio engine can retrieve one or more of the stored audio objects. The audio subsystem 430 can then communicate the audio object to the speaker subsystem 440, which can output the audio enhancement for the current conditional state using the audio object. The audio subsystem 430 can also communicate (e.g., over a network) the audio object to a computing device configured to output audio. The computing device can then output the audio enhancement for the current conditional state using the audio object. For example, the computing device can be a mobile device that can output the audio object using headphones connected to the mobile device.

The audio object database 432 maintains mappings between conditional states, physical components, and audio objects that generate, for the particular physical components, audio enhancements that simulate the physical movement of the physical components and which have characteristics that respectively match the conditional states. Therefore, an audio enhancement generated by an audio object associated with a conditional state is defined to have one or more characteristics that match the conditional state by its association with the conditional state in the audio object database 432. Populating the audio object database 432 with suitable audio objects that create effective audio enhancements for particular conditional states thus typically includes some at least manual design by human audio designers. Nevertheless, the audio enhancements can also be at least partially processed automatically according to one or more audio parameters associated with the conditional state.

Obtaining an audio object can include obtaining a previously generated audio object for a conditional state and a physically moveable component. Alternatively or in addition, obtaining an audio object includes obtaining a base audio object for the conditional state and the physically moveable component and modifying the base audio object according to one or more audio parameters associated with the conditional state.

For example, the audio object database 432 can map each value of a conditional state to one of a plurality of different audio objects for a particular physically moveable component, with each of the different audio objects simulating the sound of the component as well as being defined to match one or more characteristics of the corresponding conditional state.

Alternatively, or in addition, the robot can synthesize an audio object. The synthesized audio object can be made up of waves that, once combined and filtered, sonically resemble something in the real world or something purely fictional. For example, the waves could be arranged, filtered, and enveloped to sound like the "chug" of a steam engine or the synthetic whirring tone of a spaceship from an iconic movie. The robot can change the fundamental frequency of the synthesized audio object, for example, to ensure that that the sound is not playing in an already crowded band of the audible frequency spectrum. The robot can generate the synthesized audio object using preset models and can modulate its parameters (e.g., frequency, amplitude, wave shape, etc.) based on environmental data, user input, and a conditional state of the robot. Therefore, the audio object can correspond to an audio enhancement that is specific to a certain moment in time.

Alternatively, or in addition, the audio object database 432 can maintain a single base audio object that simulates the sound of a particular physical component and can map the conditional state to a set of one or more audio parameters that can be used to modify the base audio object so that the modified audio object generates an audio enhancement defined to match one or more characteristics of the conditional state. The parameters can be used to modify the audio enhancements at finer levels of granularity than simply storing a separate audio object for each value of the conditional state.

Audio parameters can include modification parameters that affect the characteristics of a generated sound as well as sound effect parameters that add particular effects to the generated sound.

Example modification audio parameters that can be maintained by the parameters database 434 include a volume parameter, a pitch parameter, a duration parameter, or a frequency parameter, or one or more sound effect parameters, to name just a few examples. The robot can use the volume parameter to adjust a volume for an output sound. In other words, the robot outputs the sound at a volume specified by the volume parameter. The robot can also adjusts the volume parameter to set a change in volume of an output sound. For example, as the sound is being output, the volume can rise or fall. The robot can adjust the pitch parameter to set a constant pitch for an output sound. The robot can adjust the pitch parameter to allow a rising or falling pitch during the output of the sound. The robot can adjust the duration parameter to set how much time a sound is output. The robot can adjust the frequency parameter to set the rate of repetition of a sound. For example, the robot can output a sound at a first frequency. The robot can also output a first series of sounds at the first frequency followed by a second series of sounds output at a second frequency.

Example sound effect parameters include a vibrato effect, an echo effect, a noise cancelling effect, a reverberation effect, or a maintenance-required effect, to name just a few examples.

For example, an audio object can generate a base sound that corresponds to the happy emotion state. The audio object can also be associated with one or more audio parameters, for example, a volume parameter, that specifies how loudly the base sound should be output. The audio engine 430 can modify the happy emotion state base sound using a volume parameter and send the resulting audio object to the speaker subsystem 440. In response to receiving the audio object, the speaker can output the sound generated by the audio object. Following the previous example, the output sound will contain audio elements generated from the happy emotion state base sound and the volume parameter.

As another example, certain ranges of values of within an audio parameter can correspond to certain emotion states. When a robot is in a happy emotion state, the robot can output a first audio enhancement for a physical component that includes a series of tones in a first range of frequencies reserved for the happy emotion state. The robot can then transition to an angry emotion state and output a second audio enhancement for the same physical component that includes a series of tones in a second range of frequencies reserved for the angry emotion state. As another example, certain ranges of parameter values can also correspond to certain emotion levels within an emotion state. In this example, when the robot is in a level 3 happy emotion state it can output audio at a first volume, while, when the robot is in a level 1 happy emotion state, it can output audio at a second volume that is lower than the first volume.

The audio engine 430 can include the parameters database 434 that is configured to store one or more audio parameters and be searchable by the audio engine 430 for any particular value of the internal conditional state. For example, the audio engine 430 can query the parameters database 434 with the value of the current conditional state in order to retrieve one or more audio parameters that can be used to modify an audio object to match characteristics of the current conditional state.

The conditional state can also reflect values of conditional parameters computed from the real-time inputs of various sensors, e.g., ambient volume from microphones, orientation from gyroscopes, speed, cliff presence from cliff detectors, height from depth sensors, object presence from cameras, wind presence from wind detectors, and temperature from thermometers. For example, if the ambient volume is loud, the generated audio enhancements can also be loud. If a conditional parameter of the robot indicates, from a depth sensor, that the robot is above the ground from a depth sensor, the audio object can change to convey fear. A conditional parameter can also indicate the presence or absence of users in a room, e.g., computed from camera data. If users are present, the audio objects can be different than if users are not present. A conditional parameter can also indicate the temperature of the room. If the room is cold, for example, the audio object can be one that conveys shivering, e.g., by including a vibrato sound effect. A conditional parameter can also indicate the presence of wind. If a conditional parameter indicates the presence of wind, the robot can modify an audio object such that the output audio makes the movements of the robot sound as if they are being impeded by the wind. The conditional state can also reflect more complex determinations about the environment of the robot. For example, a conditional parameter can represent a value of a sentiment analysis of speakers in the room so that the audio enhancements match the mood of the conversation and speakers. As another example, a conditional parameter can represent a genre of music that is currently playing so that the audio enhancements match the mood of the music.

As another example, the conditional state of the robot can reflect data from external sources, e.g., external sensors in communication with the robot. For example, smart home sensors can be used to compute various conditional parameters, e.g., motion detected, ambient temperature, lights being on or off, or cameras being operational or not, to name just a few examples. Other external sources can include services available through a network connection, such as the current weather and season and the performance of a stock. Other external sources can include news sources, from which the robot can receive information related to current events, and a calendar of a user, from which the robot can receive information related to personal dates or appointments.

The speaker subsystem 440 is configured to output sound in response to receiving an audio object. The speaker subsystem 440 can receive an audio object from the audio engine 430 and output a sound corresponding to the audio object. In some implementations, the speaker subsystem 440 includes remote speakers, e.g., speakers on connected handheld devices or speakers integrated into headphones.

Figure 5:
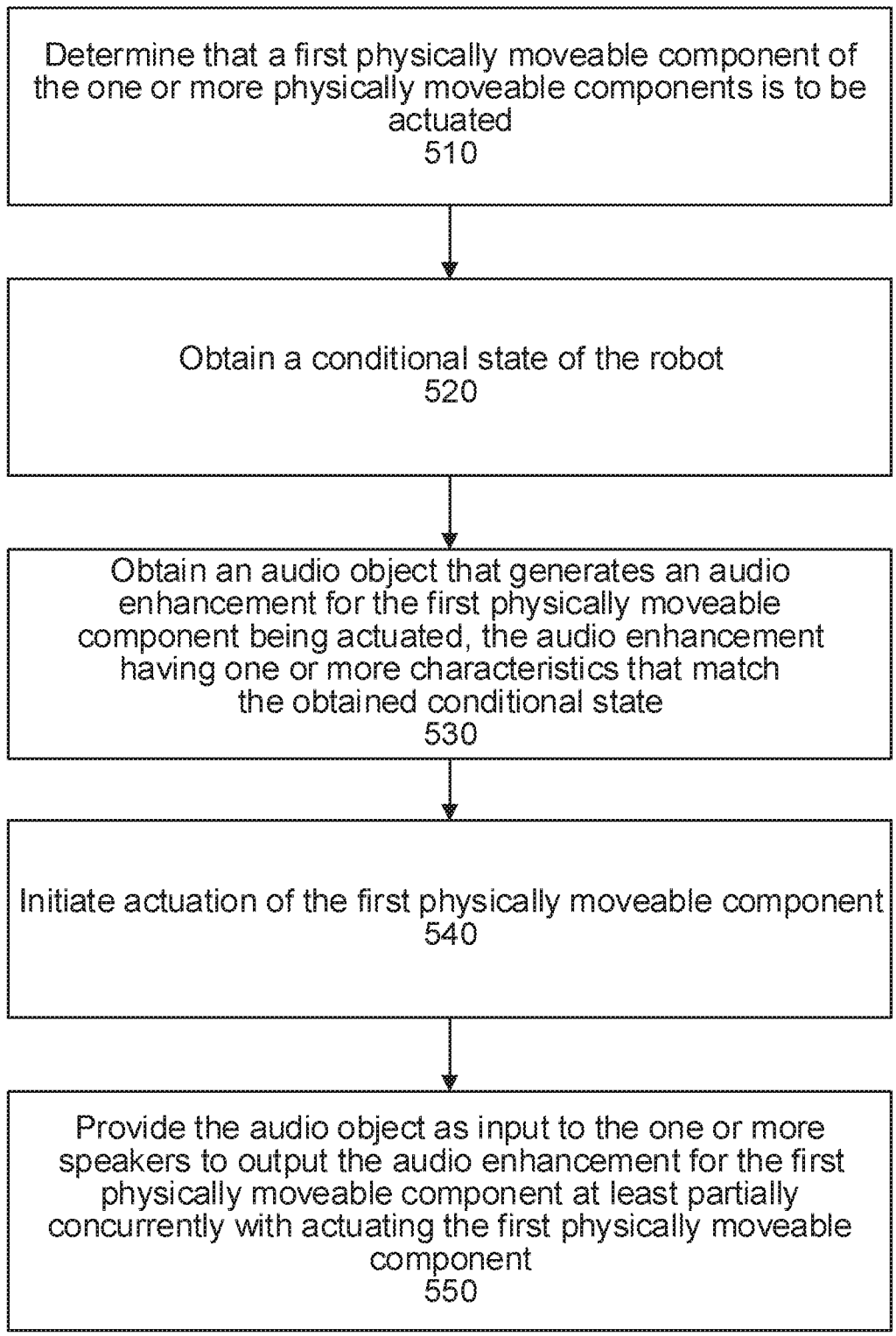
FIG. 5 is a flowchart of an example process for outputting conditional state-based audio enhancements for physically moveable robot components.

FIG. 5 is a flowchart of an example process for outputting conditional state-based audio enhancements for physically moveable robot components. The example process will be described as being performed by a robot having one or more physically moveable components and programmed appropriately in accordance with this specification. For example, when appropriately programmed, the robot 100 can perform the example process.

The robot determines that a first physically moveable component of the one or more physically moveable components is to be actuated (510). The robot can be configured to actuate one or more physically moveable components in response to a stimulus. For example, the stimulus can be the detection of a cube in an environment of the robot. After detecting the cube, the robot can choose one or more actions to perform in response to detecting the cube. As an example, the robot can choose to lift the cube.

The robot obtains an internal conditional state (520). The robot can obtain the conditional state from a condition engine that is configured to manage the internal conditional state of the robot.

The robot obtains an audio object that generates an audio enhancement of the first physically moveable component being actuated, the audio enhancement having one or more characteristics that match the obtained conditional state (530). As described above, the robot can associate each conditional state and physical component pair with one or more respective audio objects. The audio objects can be used to generate audio enhancements that are defined by the association to have characteristics that match the corresponding conditional state when used to simulate the sound of the corresponding physical component being moved.

The robot can also use audio parameters to modify the simulated sound to give the impression that the robot is in a particular conditional state.

For example, the noise cancelling effect allows the robot to output audio that cancels certain noises created by the robot's mechatronics. For example, the speaker subsystem 440 can output audio that diminishes the sound created by actuating a physically moveable component of the robot. In this example, the output audio can be a simulated sound of the physically moveable component that the audio engine has modified through signal-processing techniques to diminish the actual sound created by actuating the physically moveable component.

The one or more sound effect parameters can include a maintenance-required effect. The robot can use the maintenance-required effect to simulate the sound of strained physical components. For example, the conditional state of the robot can reflect that one or more of the robot's batteries are low, or that the signal strength of its WiFi connection is weak. The robot can use the conditional state to obtain an audio object that includes the maintenance-required effect. During a movement action, the robot can output the sound associated with the audio object to give the impression that the movement action is straining the robot.

The mappings from conditional states to audio objects and audio parameters can also allow the robot to adjust the audio enhancements based on its environment. For example, the conditional state of the robot can also represent the ambient volume of sounds detected in the environment of the robot. For example, the robot can detect sounds in its environment and represent the volume of the sounds in the conditional state. The conditional state can then be mapped to audio parameters that increase the volume of the output sound, which can allow a user to better hear the output sound over the sounds detected in the environment of the robot.

The mappings from conditional states to audio objects and audio parameters can also allow the robot to adjust the audio enhancements based on time of day. For example, the conditional state of the robot can represent the current time of day. For example, the sound output by a robot in the morning can convey a higher energy level and can be different from the sound output by the robot late at night, when the robot's energy level is decreased. Following this example, the sound output in the morning can convey that the robot is refreshed and excited, while the sound output at night can convey that the robot is happy, but tired and needs to charge.

The current speed of the robot can also be a conditional parameter that affects the audio enhancements. For example, the robot can determine its current speed and modify its conditional parameter with the current speed. Then, the audio object to which the conditional state is mapped can change when the speed changes. For example, the robot can obtain an audio object with a current speed conditional parameter that causes the frequency of sound output to increase linearly as the current speed increases. While at a first current speed, the robot can repeat a sound at a first frequency. If the robot increases its current speed to a second current speed, the robot can begin to output the sound at a second, higher frequency. In addition to the current speed conditional parameter, the robot can also obtain an audio object with a current acceleration conditional parameter or an audio object with a conditional parameter that corresponds to the friction of the wheels or treads of the robot.

In some implementations, the robot can include a number of sensory subsystems that can provide information that the robot can use as conditional parameters. For example, the robot can include a gyroscope that can determine the orientation of the robot. For example, a user can cause a change in the orientation of the robot by tilting the robot. In response, the robot can update the conditional state with the orientation information and obtain an audio object to which the updated conditional state is mapped. Thus, the audio output can change as the orientation of the robot changes. Following this example, the robot can output enhancements that sound distressed in response to being tilted, to convey that the robot wants to return to a level orientation.

In some implementations, the robot can use a cliff sensor to update the conditional state with the robot's proximity to an edge over which the robot could fall. For example, the cliff sensor can detect a cliff, such as the edge of a stair or a table, and the robot can update its conditional state with data representing that a cliff is detected. The robot can obtain, from the audio engine, an audio object to which the conditional state is mapped. As a result, the audio enhancements output by the robot can change as the robot approaches a detected cliff. For example, as the robot approaches the detected cliff, it can output an audio enhancement that conveys that the robot is scared and that the robot's fear increases as it gets closer to the edge of the cliff.

The robot initiates actuation of the first physically moveable component (540). For example, in stage 510 the robot can choose to lift a cube detected in an environment of the robot. The robot can determine that lifting the cube can be performed using a lift of the robot. In stage 540 the robot can initiate the actuation of the lift. Actuating one of the one or more physically moveable components produces a sound. For example, a lift actuator configured to actuate the lift of the robot can produce a mechanical motor sound during the lifting action.

The robot uses the one or more speakers to output the simulated sound of the first physically moveable component at least partially concurrently with actuating the first physically moveable component (550). The robot can use the one or more speakers to generate the simulated sound corresponding to the obtained audio object. The sound generated by the one or more speakers can combine with the sound produced by actuating one or more of the physically moveable components. The combined sound can be used to convey the emotion state of the robot.

In some implementations, the robot can have multiple speakers that are positioned at multiple locations on the body of the robot. For example, the robot can have a speaker at the front of the robot, a speaker at the rear of the robot, and a speaker on the head of the robot. The robot can use the multiple positions of speakers to direct a simulated sound towards a certain direction. For example, if the robot is outputting a simulated sound that corresponds to actuating the lift, the robot can use the speaker closest to the lift to output the simulated sound.

The multiple speakers can also be used to direct a user's attention towards a particular part of a robot that is in need of service. For example, if the robot encounters something sticky that causes a wheel of the robot to move differently than normal, the robot can output a noticeably different sound in the direction of the wheel, to indicate that the wheel is in need of maintenance.

In implementations where the robot has multiple speakers positioned at multiple locations, the robot can also use the multiple speakers to create sound effects that correspond to the sound effect parameters. For example, the robot can use the multiple speakers to create an echo effect or a reverberation effect. The robot can also use the multiple speaker to create a panning effect, to make it seem like a speaker outputting the simulated sound is being rotated around the robot.

Alternatively or in addition to outputting sound to augment physical components, the robot can also use the conditional state to affect other sounds generated by the robot. For example, the robot can use the conditional state to affect how text-to-speech sounds are generated by a robot. Text-to-speech, or TTS, refers to speech generation that converts text to speech output. In some implementations, if the robot is in a happy emotion state, the robot can generate speech that sounds happier, and if the robot is in an angry emotion state, the robot can generate speech that sounds angrier, even though in each case the robot is saying the same actual words/string of text. As another example, if the robot has a conditional state that represents old age, the robot can generate speech that sounds older, and if the robot has a conditional state that represents youthfulness, the robot can generate speech that sounds younger. As described above, the robot can maintain mappings between emotion states and audio objects for generating text-to-speech output or for parameters for generating such audio outputs. The robot can then use its current conditional state with the mappings in order to generate text-to-speech that matches the conditional state of the robot. The text-to-speech may be provided from another system, from text input separately by a user, or based on a message the robot is designed to convey, to name a few examples.

Figure 6:
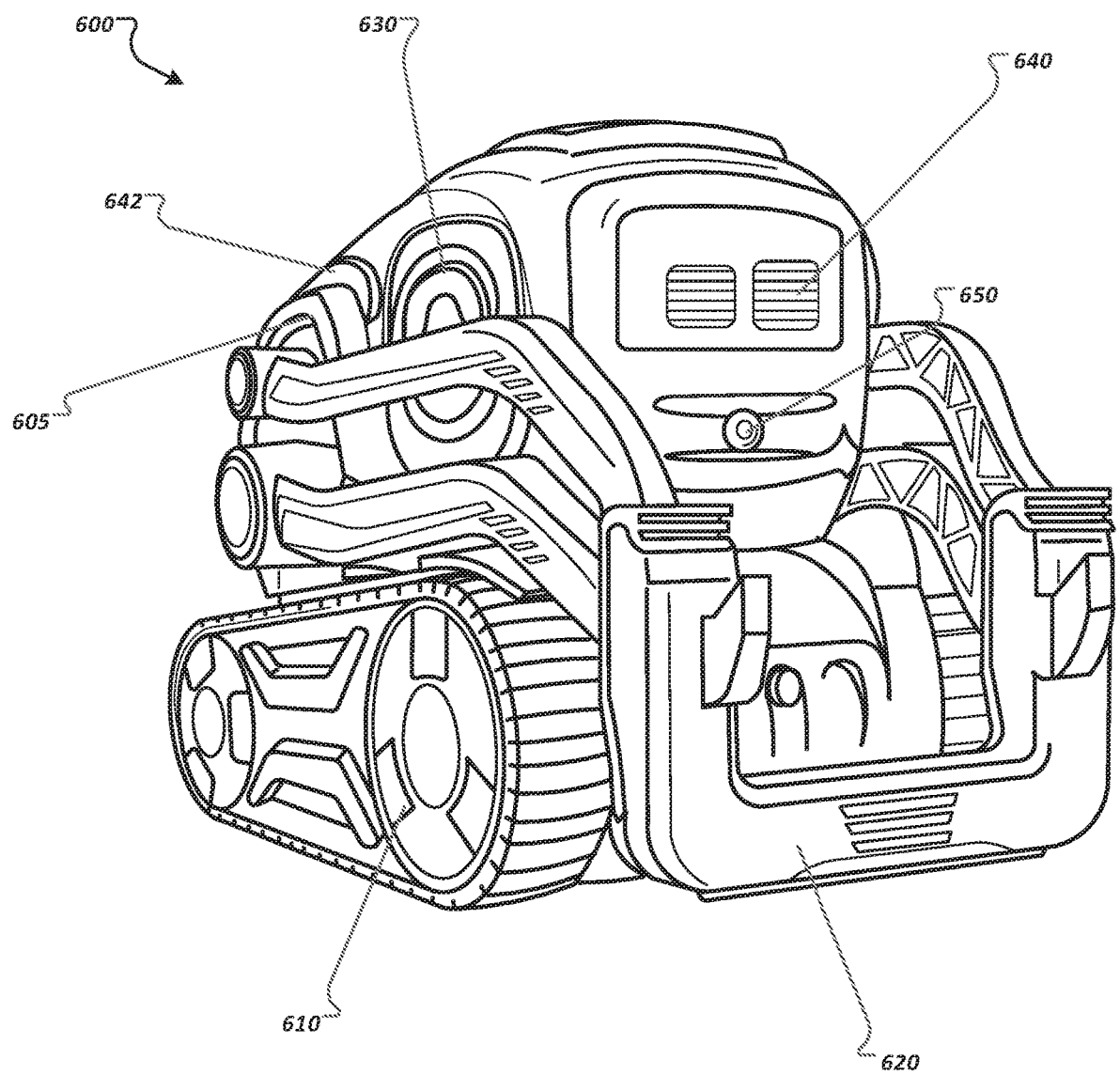
FIG. 6 illustrates components of an example robot.

FIG. 6 illustrates components of an example robot 600. The robot 600 is an example of a mobile autonomous robotic system that is suitable to perform the techniques described in this specification. The robot 600 can use the techniques described above for use as a toy or as a personal companion. Other suitable robots are described in commonly owned U.S. patent application Ser. Nos. 15/725,209 and 15/694,710, which are herein incorporated by reference.

The robot 600 generally includes a body 605 and a number of physically moveable components. The components of the robot 600 can house data processing hardware and control hardware of the robot. The physically moveable components of the robot 600 include a propulsion system 610, an effector subsystem 620, and a head 630.

The robot 600 also includes integrated output and input subsystems.

The output subsystems can include control subsystems that cause physical movements of robotic components; presentation subsystems that present visual or audio information, e.g., screen displays, lights, and speakers; and communication subsystems that communicate information across one or more communications networks, to name just a few examples.

The control subsystems of the robot 600 include a propulsion system 610. In this example, the propulsion system 610 has wheels and treads. Each wheel subsystem can be independently operated, which allows the robot to spin and perform smooth arcing maneuvers. In some implementations, the propulsion subsystem 610 includes sensors that provide feedback representing how quickly one or more of the wheels are turning. The robot can use this information to control its position and speed.

The control subsystems of the robot 600 include an effector subsystem 620 that is operable to manipulate objects in the robot's environment. In this example, the effector subsystem 620 includes a lift and one or more motors for controlling the lift. The effector subsystem 620 can be used to lift and manipulate objects in the robot's environment. The effector subsystem 620 can also be used as an input subsystem, which is described in more detail below.

The control subsystems of the robot 600 also include a robot head 630, which has the ability to tilt up and down and optionally side to side. On the robot 600, the tilt of the head 630 also directly affects the angle of a camera 650.

The presentation subsystems of the robot 600 include one or more electronic displays, e.g., electronic display 640, which can each be a color or a monochrome display. The electronic display 640 can be used to display any appropriate information. In FIG. 6, the electronic display 640 is presenting a simulated pair of eyes that can be used to provide character-specific information. The presentation subsystems of the robot 600 also include one or more lights 642 that can each turn on and off, optionally in multiple different colors.

The presentation subsystems of the robot 600 can also include one or more speakers, which can play one or more sounds in sequence or concurrently so that the sounds are at least partially overlapping.

The input subsystems of the robot 600 include one or more perception subsystems, one or more audio subsystems, one or more touch detection subsystems, one or more motion detection subsystems, one or more effector input subsystems, and one or more accessory input subsystems, to name just a few examples.

The perception subsystems of the robot 600 are configured to sense light from an environment of the robot. The perception subsystems can include a visible spectrum camera, an infrared camera, or a distance sensor, to name just a few examples. For example, the robot 600 includes an integrated camera 650. The perception subsystems of the robot 600 can include one or more distance sensors. Each distance sensor generates an estimated distance to the nearest object in front of the sensor.

The perception subsystems of the robot 600 can include one or more light sensors. The light sensors are simpler electronically than cameras and generate a signal when a sufficient amount of light is detected. In some implementations, light sensors can be combined with light sources to implement integrated cliff detectors on the bottom of the robot. When light generated by a light source is no longer reflected back into the light sensor, the robot 600 can interpret this state as being over the edge of a table or another surface.

The audio subsystems of the robot 600 are configured to capture from the environment of the robot. For example, the robot 600 can include a directional microphone subsystem having one or more microphones. The directional microphone subsystem also includes post-processing functionality that generates a direction, a direction probability distribution, location, or location probability distribution in a particular coordinate system in response to receiving a sound. Each generated direction represents a most likely direction from which the sound originated. The directional microphone subsystem can use various conventional beam-forming algorithms to generate the directions.

The touch detection subsystems of the robot 600 are configured to determine when the robot is being touched or touched in particular ways. The touch detection subsystems can include touch sensors, and each touch sensor can indicate when the robot is being touched by a user, e.g., by measuring changes in capacitance. The robot can include touch sensors on dedicated portions of the robot's body, e.g., on the top, on the bottom, or both. Multiple touch sensors can also be configured to detect different touch gestures or modes, e.g., a stroke, tap, rotation, or grasp.

The motion detection subsystems of the robot 600 are configured to measure movement of the robot. The motion detection subsystems can include motion sensors and each motion sensor can indicate that the robot is moving in a particular way. For example, a gyroscope sensor can indicate a relative orientation of the robot. As another example, an accelerometer can indicate a direction and a magnitude of an acceleration, e.g., of the Earth's gravitational field.

The effector input subsystems of the robot 600 are configured to determine when a user is physically manipulating components of the robot 600. For example, a user can physically manipulate the lift of the effector subsystem 620, which can result in an effector input subsystem generating an input signal for the robot 600. As another example, the effector subsystem 620 can detect whether or not the lift is currently supporting the weight of any objects. The result of such a determination can also result in an input signal for the robot 600.

The robot 600 can also use inputs received from one or more integrated input subsystems. The integrated input subsystems can indicate discrete user actions with the robot 600. For example, the integrated input subsystems can indicate when the robot is being charged, when the robot has been docked in a docking station, and when a user has pushed buttons on the robot, to name just a few examples.

The robot 600 can also use inputs received from one or more accessory input subsystems that are configured to communicate with the robot 600. For example, the robot 600 can interact with one or more cubes that are configured with electronics that allow the cubes to communicate with the robot 600 wirelessly. Such accessories that are configured to communicate with the robot can have embedded sensors whose outputs can be communicated to the robot 600 either directly or over a network connection. For example, a cube can be configured with a motion sensor and can communicate an indication that a user is shaking the cube.

The robot 600 can also use inputs received from one or more environmental sensors that each indicate a particular property of the environment of the robot. Example environmental sensors include temperature sensors and humidity sensors to name just a few examples.

One or more of the input subsystems described above may also be referred to as "sensor subsystems." The sensor subsystems allow a robot to determine when a user is interacting with the robot, e.g., for the purposes of providing user input, using a representation of the environment rather than through explicit electronic commands, e.g., commands generated and sent to the robot by a smartphone application. The representations generated by the sensor subsystems may be referred to as "sensor inputs."

The robot 600 also includes computing subsystems having data processing hardware, computer-readable media, and networking hardware. Each of these components can serve to provide the functionality of a portion or all of the input and output subsystems described above or as additional input and output subsystems of the robot 600, as the situation or application requires. For example, one or more integrated data processing apparatus can execute computer program instructions stored on computer-readable media in order to provide some of the functionality described above.

The robot 600 can also be configured to communicate with a cloud-based computing system having one or more computers in one or more locations. The cloud-based computing system can provide online support services for the robot. For example, the robot can offload portions of some of the operations described in this specification to the cloud-based system, e.g., for determining behaviors, computing signals, and performing natural language processing of audio streams.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For a robot to be configured to perform particular operations or actions means that the system has installed on it software, firmware, hardware, or a combination of them that in operation cause the robot to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a robot, a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method performed by an robot, the method comprising:
- determining that a first physically moveable component of one or more physically moveable components is to be actuated;
- obtaining a conditional state of the robot;
- obtaining an audio object that generates an audio enhancement for the first physically moveable component being actuated, the audio enhancement having one or more characteristics that match the obtained conditional state;
- initiating actuation of the first physically moveable component; and
- providing the audio object as input to one or more speakers to output the audio enhancement for the first physically moveable component at least partially concurrently with actuating the first physically moveable component.

Embodiment 2 is the method of embodiment 1, wherein the robot has a conditional state that comprises an emotion state of the robot.

Embodiment 3 is the method of embodiments 2, wherein the emotion state of the robot includes a happy state, a sad state, an excited state, a sneaky state, an angry state, or a tired state.

Embodiment 4 is the method of embodiments 1-3 wherein the audio object has one or more associated parameters, and wherein outputting the audio enhancement comprises modifying a sound generated by the audio object according to the one or more associated parameters.

Embodiment 5 is the method of embodiments 4 wherein the one or more associated audio parameters include a volume, a pitch, a duration, a frequency, or a sound effect.

Embodiment 6 is the method of embodiments 5 wherein the sound effect includes a vibrato effect, an echo effect, a noise cancelling effect, or a maintenance-required effect.

Embodiment 7 is the method of embodiments 1-6 wherein a conditional parameter of the conditional state is a current speed of the robot, and further comprising:
- determining the current speed of the robot; and
- modifying the audio enhancement generated by the audio object according to the current speed of the robot.

Embodiment 8 is the method of embodiments 1-7 wherein the operations further comprise:
- obtaining a second audio object for generating text-to-speech audio output having one or more characteristics that match the obtained conditional state; and
- providing the second audio output as input to the one or more speakers to output text-to-speech audio having the one or more characteristics that match the obtained conditional state.

Embodiment 9 is a method comprising:
- determining that a first physically moveable component of one or more physically moveable components is to be actuated;
- obtaining a conditional state of a robot;
- obtaining an audio object that generates an audio enhancement for the first physically moveable component being actuated, the audio enhancement having one or more characteristics that match the obtained conditional state;
- initiating actuation of the first physically moveable component; and
- providing the audio object as input to the one or more speakers to output the audio enhancement for the first physically moveable component at least partially concurrently with actuating the first physically moveable component.

Embodiment 10 is the method of embodiment 9, wherein the robot has a conditional state that comprises an emotion state of the robot.

Embodiment 11 is the method of embodiments 2, wherein the emotion state of the robot includes a happy state, a sad state, an excited state, a sneaky state, an angry state, or a tired state.

Embodiment 12 is the method of embodiments 9-11 wherein the audio object has one or more associated parameters, and wherein outputting the audio enhancement comprises modifying a sound generated by the audio object according to the one or more associated parameters.

Embodiment 13 is the method of embodiments 12 wherein the one or more associated audio parameters include a volume, a pitch, a duration, a frequency, or a sound effect.

Embodiment 14 is the method of embodiments 13 wherein the sound effect includes a vibrato effect, an echo effect, a noise cancelling effect, or a maintenance-required effect.

Embodiment 15 is the method of embodiments 9-14 wherein a conditional parameter of the conditional state is a current speed of the robot, and further comprising:
- determining the current speed of the robot; and
- modifying the audio enhancement generated by the audio object according to the current speed of the robot.

Embodiment 16 is the method of embodiments 9-15 wherein the operations further comprise:
- obtaining a second audio object for generating text-to-speech audio output having one or more characteristics that match the obtained conditional state; and
- providing the second audio output as input to the one or more speakers to output text-to-speech audio having the one or more characteristics that match the obtained conditional state.

Embodiment 17 is a computer readable medium encoded with a computer program, the
- program comprising instructions that are operable, when executed by a robot comprising one or more processors and one or more sensor subsystems, to cause the robot to perform the method of any one of embodiments 1 to 16.

Embodiment 18 is a method performed by a robot, the method comprising:

determining that a selected action includes outputting text-to-speech audio output using the one or more speakers;
obtaining a conditional state of the robot;
obtaining an audio object for generating text-to-speech audio output having one or more characteristics that match the obtained conditional state; and
providing the audio object as input to the one or more speakers to output text-to-speech audio having the one or more characteristics that match the obtained conditional state.

Embodiment 19 is a robot comprising: one or more physically moveable components, one or more speakers, one or more processors, and one or more storage devices storing instructions that are operable, when executed by the one or more processors, to cause the robot to perform the method of any one of embodiments 1-18.

Embodiment 20 is a computer storage medium encoded with a computer program, the program comprising instructions that are operable, when executed by a robot, to cause the robot to perform the method of any one of claims 1 to 18.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can, in some cases, be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A robot comprising:
one or more physically moveable components;
one or more speakers;
one or more processors; and
one or more storage devices storing instructions that are operable, when executed by the one or more processors, to cause the robot to perform operations comprising:
determining that a first physically moveable component of the one or more physically moveable components is to be actuated;
obtaining a conditional state of the robot, which conditional state matches a sentiment of music playing in an environment around the robot;
obtaining an audio object that generates a non-text-to-speech audio enhancement for the first physically moveable component being actuated, the audio enhancement having a blend of one or more characteristics that match the obtained conditional state and the audio enhancement simulates a sound produced by actuating the first physically moveable component;
initiating actuation of the first physically moveable component; and
providing the audio object as input to the one or more speakers to output the audio enhancement for the first physically moveable component at least partially concurrently with actuating the first physically moveable component.

2. The robot of claim 1, wherein the conditional state comprises an emotion state of the robot.

3. The robot of claim 2, wherein the emotion state of the robot includes a happy state, a sad state, an excited state, a sneaky state, an angry state, or a tired state.

4. The robot of claim 1, wherein the audio object has one or more associated parameters, and wherein outputting the audio enhancement comprises modifying a sound generated by the audio object according to the one or more associated parameters.

5. The robot of claim 4, wherein the one or more associated audio parameters include a volume, a pitch, a duration, a frequency, or a sound effect.

6. The robot of claim 5, wherein the sound effect includes a vibrato effect, an echo effect, a noise cancelling effect, or a maintenance-required effect.

7. The robot of claim 3, wherein a conditional parameter of the conditional state is a current speed of the robot, and further comprising: determining the current speed of the robot; and modifying the audio enhancement generated by the audio object according to the current speed of the robot.

8. The robot of claim 1, wherein the operations further comprise: obtaining a second audio object for generating text-to-speech audio output having one or more characteristics that match the obtained conditional state; and providing the second audio output as input to the one or more speakers to output text-to-speech audio having the one or more characteristics that match the obtained conditional state.

9. A method comprising:
determining that a first physically moveable component of the one or more physically moveable components is to be actuated;
obtaining a conditional state of the robot, which conditional state matches a sentiment of music playing in an environment around the robot;
obtaining an audio object that generates a non-text-to-speech audio enhancement for the first physically moveable component being actuated, the audio enhancement having a blend of one or more characteristics that match the obtained conditional state and the audio enhancement simulates a sound produced by actuating the first physically moveable component;

initiating actuation of the first physically moveable component; and providing the audio object as input to the one or more speakers to output the audio enhancement for the first physically moveable component at least partially concurrently with actuating the first physically moveable component.

10. The method of claim 9, wherein the conditional state comprises an emotion state of the robot.

11. The method of claim 10, wherein the emotion state of the robot includes a happy state, a sad state, an excited state, a sneaky state, an angry state, or a tired state.

12. The method of claim 9, wherein the audio object has one or more associated parameters, and wherein outputting the audio enhancement comprises modifying a sound generated by the audio object according to the one or more associated parameters.

13. The method of claim 12, wherein the one or more associated audio parameters include a volume, a pitch, a duration, a frequency, or a sound effect.

14. The method of claim 13, wherein the sound effect includes a vibrato effect, an echo effect, a noise cancelling effect, or a maintenance-required effect.

15. The method of claim 11, wherein a conditional parameter of the conditional state is a current speed of the robot, and further comprising: determining the current speed of the robot; and modifying the audio enhancement generated by the audio object according to the current speed of the robot.

16. The method of claim 9, wherein the operations further comprise: obtaining a second audio object for generating text-to-speech audio output having one or more characteristics that match the obtained conditional state; and providing the second audio output as input to the one or more speakers to output text-to-speech audio having the one or more characteristics that match the obtained conditional state.

17. A non-transitory computer readable medium encoded with a computer program, the program comprising
  instructions that are operable, when executed by a robot comprising one or more processors, to cause the robot to perform the method of:
    determining that a first physically moveable component of one or more physically moveable components is to be actuated;
    obtaining a conditional state of the robot, which conditional state matches a sentiment of music playing in an environment around the robot;
    obtaining an audio object that generates a non-text-to-speech audio enhancement for the first physically moveable component being actuated, the audio enhancement having a blend of one or more characteristics that match the obtained conditional state and the audio enhancement simulates a sound produced by actuating the first physically moveable component;
    initiating actuation of the first physically moveable component; and
    providing the audio object as input to one or more speakers to output the audio enhancement for the first physically moveable component at least partially concurrently with actuating the first physically moveable component.

18. A robot comprising:
one or more speakers;
one or more processors; and
one or more storage devices storing instructions that are operable, when executed by the one or more processors, to cause the robot to perform operations comprising:
  determining that a selected action includes outputting non-text-to-speech audio output using the one or more speakers;
  obtaining a conditional state of the robot, which conditional state matches a sentiment of music playing in an environment around the robot;
  obtaining an audio object for generating non-text-to-speech audio output having a blend of one or more characteristics that match the obtained conditional state and the audio enhancement simulates a sound produced by actuating the first physically moveable component; and
  providing the audio object as input to the one or more speakers to output audio having the one or more characteristics that match the obtained conditional state.

19. A robot comprising:
one or more physically moveable components;
one or more speakers;
one or more processors; and
one or more storage devices storing instructions that are operable, when executed by the one or more processors, to cause the robot to perform operations comprising:
  determining that a first physically moveable component of the one or more physically moveable components is to be actuated;
  obtaining a conditional state of the robot from at least one touch detection subsystem, which conditional state matches a sentiment of a touch from at least one person in an environment around the robot;
  obtaining an audio object that generates a non-text-to-speech audio enhancement for the first physically moveable component being actuated, the audio enhancement having a blend of one or more characteristics that match the obtained conditional state and the audio enhancement simulates a sound produced by actuating the first physically moveable component;
  initiating actuation of the first physically moveable component; and
  providing the audio object as input to the one or more speakers to output the audio enhancement for the first physically moveable component at least partially concurrently with actuating the first physically moveable component.

20. A method comprising:
determining that a first physically moveable component of the one or more physically moveable components is to be actuated;
obtaining a conditional state of a robot from at least one touch detection subsystem, which conditional state matches a sentiment of a touch from at least one person in an environment around the robot;
obtaining an audio object that generates a non-text-to-speech audio enhancement for the first physically moveable component being actuated, the audio enhancement having a blend of one or more characteristics that match the obtained conditional state and the audio enhancement simulates a sound produced by actuating the first physically moveable component;
initiating actuation of the first physically moveable component; and providing the audio object as input to the one or more speakers to output the audio enhancement for the first physically moveable component at least partially concurrently with actuating the first physically moveable component.

21. A non-transitory computer readable medium encoded with a computer program, the program comprising
instructions that are operable, when executed by a robot comprising one or more processors, to cause the robot to perform the method of:
determining that a first physically moveable component of one or more physically moveable components is to be actuated;
obtaining a conditional state of the robot from at least one touch detection subsystem, which conditional state matches a sentiment of a touch from a person in an environment around the robot;
obtaining an audio object that generates a non-text-to speech audio enhancement for the first physically moveable component being actuated, the audio enhancement having a blend of one or more characteristics that match the obtained conditional state and the audio enhancement simulates a sound produced by actuating the first physically moveable component;
initiating actuation of the first physically moveable component; and
providing the audio object as input to one or more speakers to output the audio enhancement for the first physically moveable component at least partially concurrently with actuating the first physically moveable component.

22. A robot comprising:
one or more speakers;
one or more processors; and
one or more storage devices storing instructions that are operable, when executed by the one or more processors, to cause the robot to perform operations comprising:
determining that a selected action includes outputting non-text-to-speech audio output using the one or more speakers;
obtaining a conditional state of the robot from at least one touch detection subsystem, which conditional state matches a sentiment of a touch from a person in an environment around the robot;
obtaining an audio object for generating non-text-to-speech audio output having a blend of one or more characteristics that match the obtained conditional state and an audio enhancement that simulates a sound produced by actuating a first physically moveable component on the robot; and
providing the audio object as input to the one or more speakers to output audio having the one or more characteristics that match the obtained conditional state.

* * * * *